United States Patent
Auracher

(10) Patent No.: US 6,564,299 B1
(45) Date of Patent: May 13, 2003

(54) METHOD AND APPARATUS FOR DEFINING CACHEABLE ADDRESS RANGES

(75) Inventor: Stefan Auracher, Baierbrunn (DE)

(73) Assignee: LSI Logic Corporation, Milpitas, CA (US)

( * ) Notice: Subject to any disclaimer, the term of this patent is extended or adjusted under 35 U.S.C. 154(b) by 81 days.

(21) Appl. No.: 09/918,021

(22) Filed: Jul. 30, 2001

(51) Int. Cl.[7] .............................................. G06F 12/00
(52) U.S. Cl. ........................................ 711/138; 711/3
(58) Field of Search ................................ 711/138, 139, 711/3

(56) References Cited

U.S. PATENT DOCUMENTS

| | | | | | |
|---|---|---|---|---|---|
| 5,091,850 A | * | 2/1992 | Culley | ........................... | 711/3 |
| 5,157,774 A | * | 10/1992 | Culley | ........................ | 711/139 |
| 5,210,847 A | * | 5/1993 | Thome et al. | .............. | 711/138 |
| 5,625,793 A | * | 4/1997 | Mirza | ......................... | 711/138 |
| 5,890,216 A | * | 3/1999 | Derrick et al. | ............. | 711/138 |
| 5,974,510 A | * | 10/1999 | Cheng et al. | ............... | 711/138 |
| 6,021,470 A | * | 2/2000 | Frank et al. | ................ | 711/138 |
| 6,138,216 A | * | 10/2000 | Harvey | ....................... | 711/139 |
| 6,256,710 B1 | * | 7/2001 | Yazdy et al. | ................ | 711/133 |
| 6,463,510 B1 | * | 10/2002 | Jones et al. | ................. | 711/138 |
| 2002/0087803 A1 | * | 7/2002 | Jones et al. | ................. | 711/138 |

* cited by examiner

*Primary Examiner*—Kevin Verbrugge
(74) *Attorney, Agent, or Firm*—Christopher P. Maiorana PC

(57) ABSTRACT

An addressable circuit configured to control a definition of an addressable range for the circuit. The circuit may comprise at least one register, at east one flag, an input and control logic. The register may be configured to define a range used for determining an addressable range for the circuit. The flag may be configured to define whether a predetermined range is to be inverted for determining the addressable range for the circuit. The input may be configured to receive an address for an access to the circuit. The control logic may be configured to process the received address to determine whether the received address is within the addressable range for the circuit, the control logic being responsive to the register and to the flag for determining the addressable range therefrom.

20 Claims, 14 Drawing Sheets

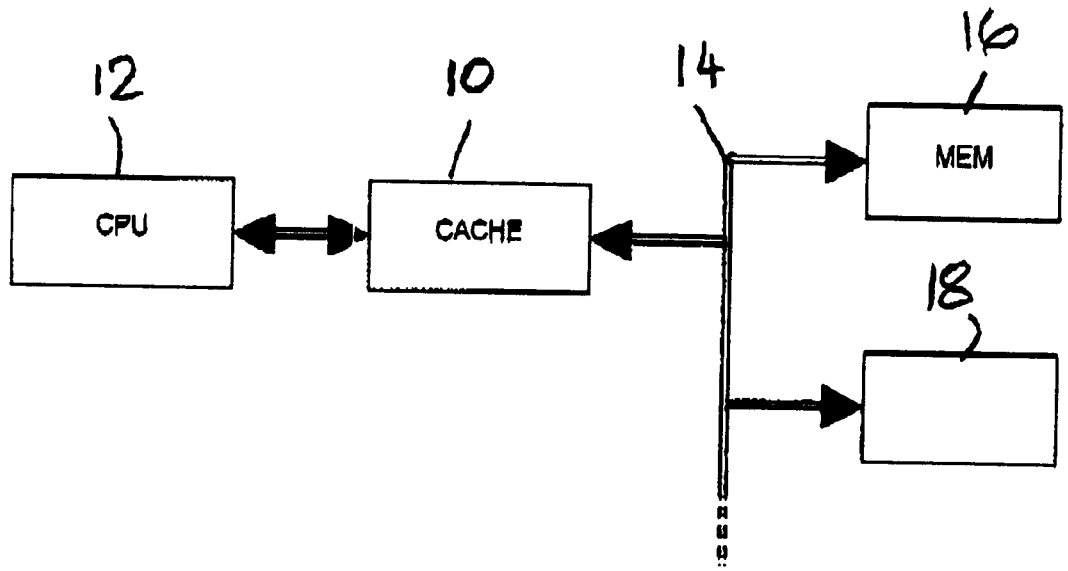
FIG. 1
(CONVENTIONAL)
FIG. 2
(CONVENTIONAL)

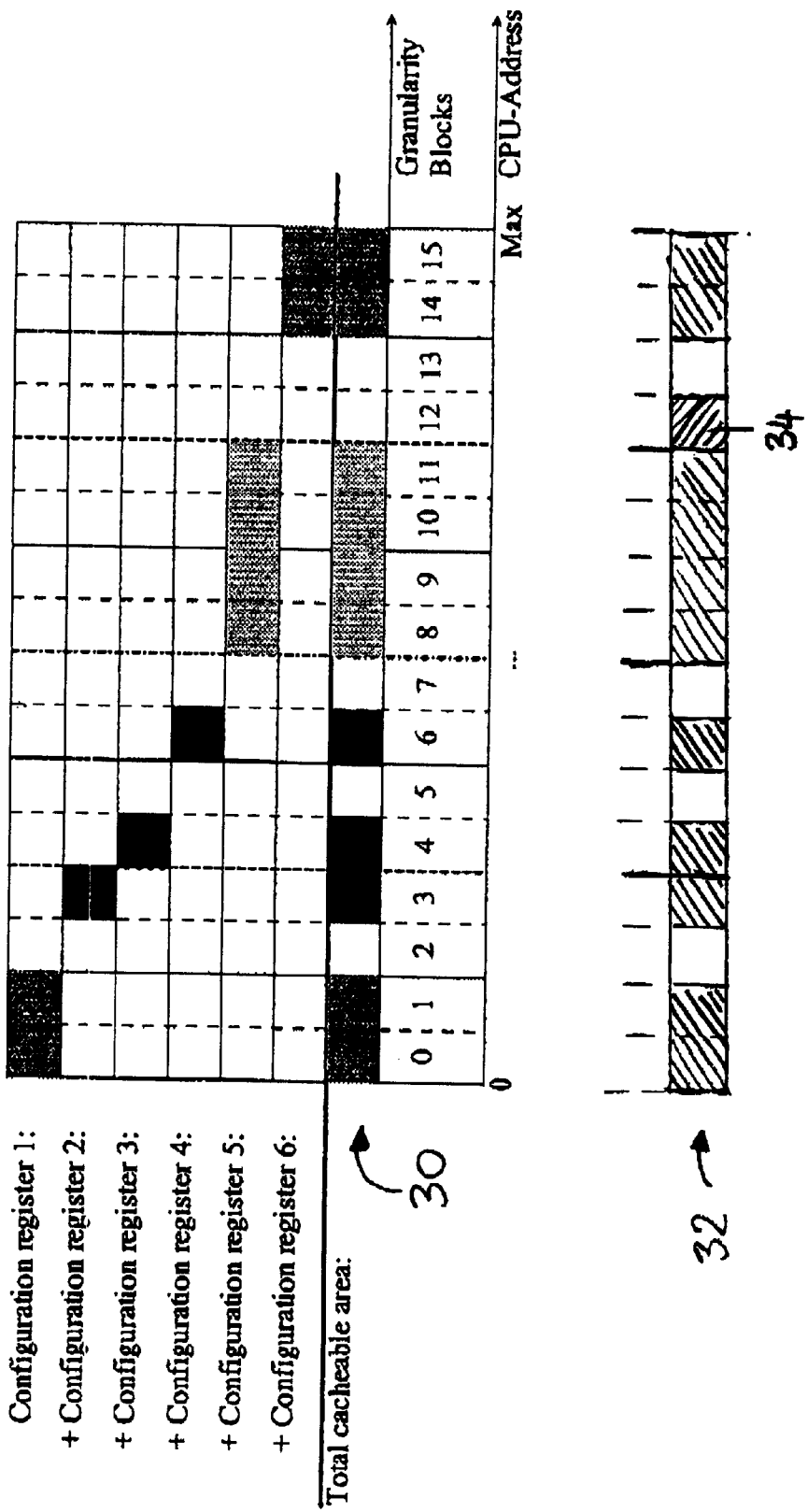
FIG. 3 (CONVENTIONAL)

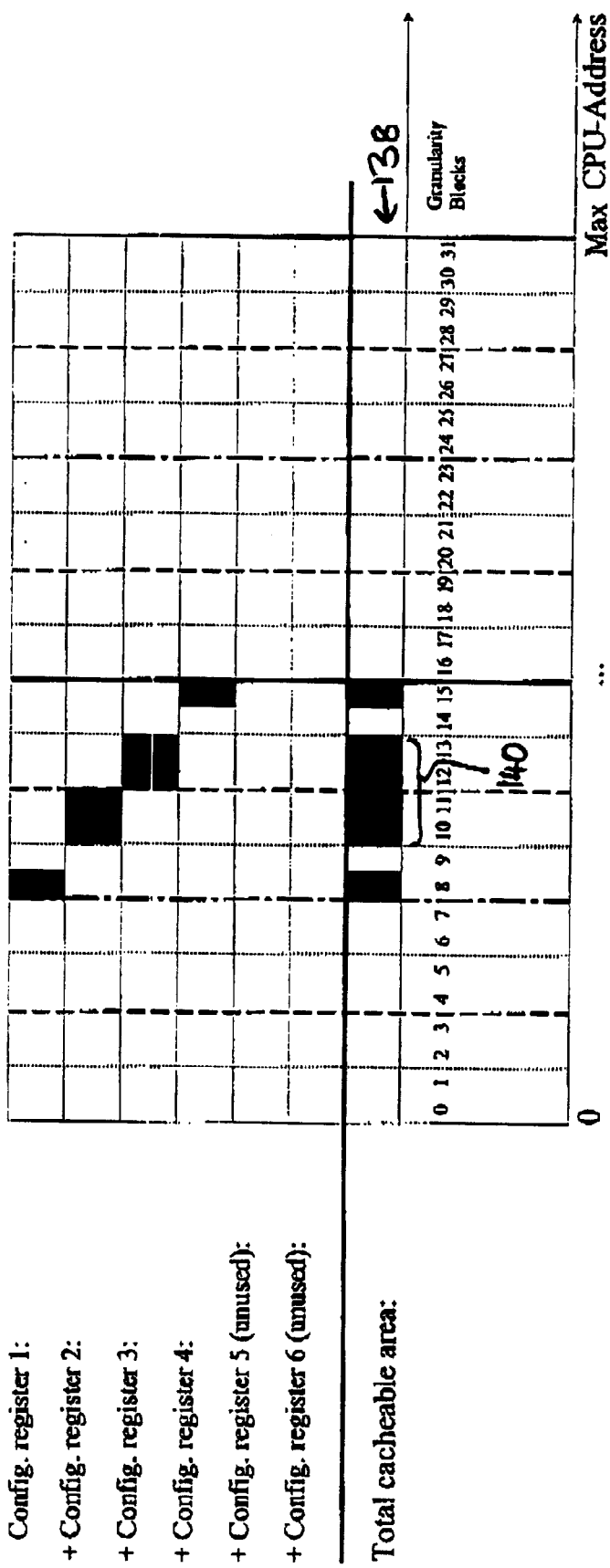
FIG. 15 (CONVENTIONAL)

METHOD AND APPARATUS FOR DEFINING CACHEABLE ADDRESS RANGES

FIELD OF THE INVENTION

The present invention relates to addressable circuits, and to the definition of an addressable range therefor. For example, the invention may find application to digital caches, memory management units (MMU's), paging units, chip-select decoders, write buffers, and other circuits which require an addressable range to be controllably defined.

BACKGROUND TO THE INVENTION

FIG. 1 illustrates a typical, conventional arrangement of a cache 10 in a digital processing system. The cache 10 is interposed between a main processor (CPU) 12 and a peripheral bus 14 for communicating with addressable system resources, such as memory 16 and one or more peripherals 18. The cache 10 contains its own fast access memory, which is used to buffer data (ideally the most frequently accessed data) which would normally be accessed over the peripheral bus 14. When the CPU requests an access which can be handled by the cache 10 (referred to as a cache-hit), the cache 10 services the access and suspends the access to the peripheral bus 14. Since the cache can service the access more rapidly than the other devices, the system performance is improved.

It is conventional in the art for the cache 10 to include a plurality of configuration registers for defining the range or ranges of addresses which are cacheable, rather than treating all addresses as cacheable. There are many situations in which the cache 10 should be prevented from buffering certain areas of the address range. For example, direct memory-mapped input and/our output (MMIO) addresses for peripherals should not be cached (if they were, during a read-access the cache would return previously buffered data rather than the actual live data from the peripheral; during a write-access, the cache would intercept the data, and possibly delay the writing of the data to the peripheral). Similarly, if a resource is accessible to a plurality of master devices, then the resource address should not be cached, because the cache may not contain the current data for the resource (e.g., if the cache is written to by one master, and read by another). A further situation is if a particular resource is as fast as the cache (e.g., fast memory). In that case, it would be a waste of cache resources to cache the address of the fast resource, since this would not improve system performance.

FIG. 2 illustrates schematically the format of conventional configuration registers 20 in the cache 10. There are a fixed number of registers 20 (e.g., six registers), and each register defines a sub-range of cacheable addresses by means of a base address or start address field 22 and a size field 24. The register also includes an enable flag field 26 which determines whether the register is enabled. If the register is disabled, then the contents are ignored (so as not to define an incorrect area if not all six registers are needed to define the cacheable area).

In order to simplify the cache logic, and to ensure speedy operation, certain limitations are applied to the definitions of cacheable addresses in the configuration registers. Firstly, instead of treating addresses on an individual basis, the address ranges are defined in terms of blocks of a certain unit size, such as 4 KB. This is also referred to as the granularity of the cacheable address definitions. Both the start address field 22 and the size field 24 are defined either as, or to be, integer multiples of the granularity unit. Concerning the size, the factor by which the granularity unit is multiplied must furthermore be a power of two. Additionally, the start address is limited to being an integer multiple of the size. Therefore, if the size is 8 KB, then the start address can only be 0, 8 KB, 16 KB, etc. These limitations make the address ranges easier to process.

The sum of valid addressable areas defined by the configuration registers makes up the total cacheable area. This is then used in the address-path logic of the cache. When a CPU-access reaches the cache, the incoming address is compared with all of the single memory areas simultaneously. Only if the incoming address lies within any cacheable area defined by a configuration register, is the request serviceable by the cache. Otherwise, the cache suppresses the "hit", and forwards the access to the peripheral bus 14.

FIG. 3 illustrates by way of example a memory map showing the definition of cacheable areas (dark or patterned areas) by six configuration registers (1–6). In this example, the address range is 0–65535 (16 bit address), and the granularity is 4 KB, such that the address range is divided into 16 blocks (0–15), each of 4 KB. In the illustrated example, all six registers are required to define the illustrated net cacheable range denoted by 30. In particular, two registers are required to define the adjacent 2-blocks defined by configurations registers 2 and 3, since the first block starts at an "odd" address. (If the first block had started at an even address, then the two blocks could have been defined by a single configuration register).

Also, it would be impossible to define a range such as that denoted by 32 (including an additional cacheable block 34), since an additional (seventh) configuration register would be needed to define the block 34.

SUMMARY OF THE INVENTION

The present invention concerns an addressable circuit configured to control the definition of an addressable range for the circuit. The circuit may comprise at least one register, at east one flag, an input and control logic. The register may be configured to define a range used for determining an addressable range for the circuit. The flag may be configured to define whether a predetermined range is to be inverted for determining the addressable range for the circuit. The input may be configured to receive an address for an access to the circuit. The control logic may be configured to process the received address to determine whether the received address is within the addressable range for the circuit, the control logic being responsive to the register and to the flag for determining the addressable range therefrom.

The objects, features and advantages of the present invention include providing an addressable circuit that may (i) have a versatile way of defining an addressable range, and which can be compatible with existing controls, (ii) provide flexibility in a definition of an addressable range, (iii) enable a reduction in the number of configuration registers needed to define a certain address range and/or (iv) enable ranges to be defined which hitherto were not possible using a limited number of configuration registers.

BRIEF DESCRIPTION OF THE DRAWINGS

These and other objects, features and advantages of the present invention will be apparent from the following detailed description and the appended claims and drawings, in which FIG. 1 is a schematic block diagram illustrating a conventional system using a cache;

FIG. 2 is a schematic representation of the format of conventional configuration registers in a cache;

FIG. 3 is a schematic memory map showing how plural configuration registers define conventionally a cacheable map;

FIG. 15 is a schematic memory map showing for comparison how the same range would be defined conventionally.

DESCRIPTION OF PREFERRED EMBODIMENTS

Figure 4:
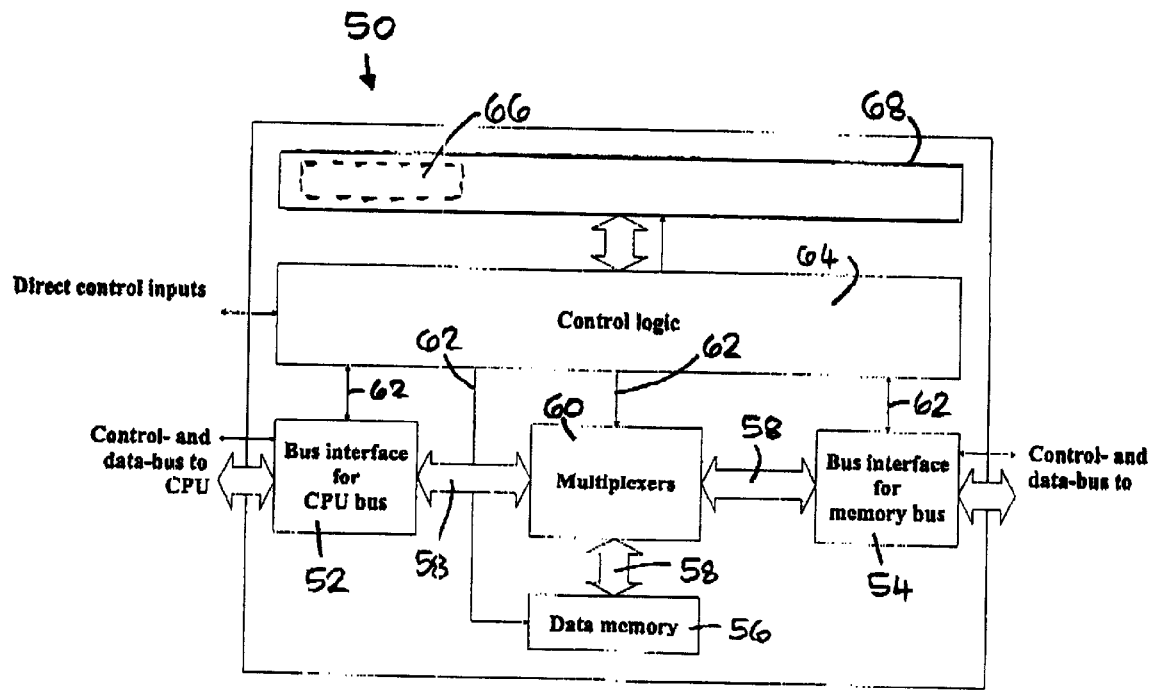
FIG. 4 is a schematic block diagram of a cache in accordance with a first embodiment of the invention.

Referring to FIG. 4, a cache circuit 50 is shown as a typical addressable circuit to which the present invention may be applied. However, it will be appreciated that the invention is not limited to cache circuits, and may find application for any addressable circuit. The cache circuit 50 is typically implemented in an integrated circuit, either on its own or combined with other circuits (for example, a processor, cached memory, etc.). The cache circuit 50 comprises a CPU bus interface 52 for coupling to a CPU bus, a peripheral bus interface 54 for coupling to a peripheral (cached) bus, and an internal memory 56 for storing buffered data within the cache. Bi-directional buses 58 from the interfaces 52 and 54 and from the memory 56 are linked by a multiplexer 60 which functions to route data between the buses 58. The interfaces 52 and 54, the memory 56 and the multiplexer 60 are controlled by control signals 62 from control logic 64. The control logic 64 functions on a global level to control the operation of the cache, and in particular decides whether an access address received through the CPU interface 52 can be serviced by the cache (i.e. is a "cache hit"), or whether the access address should be routed unserviced through to the peripheral bus.

One of the detailed functions of the control logic is to determine whether the access address received through the CPU interface 52 corresponds to an allowable cacheable area of the address range. The cacheable area is defined by a plurality of configuration registers 66, contained in a control register area 68 accessible by the control logic 64. The configuration registers 66 are programmable by external signals receivable through the CPU interface 52, to enable the cache to be programmed in accordance with an application's or a system's requirements.

Figure 5:
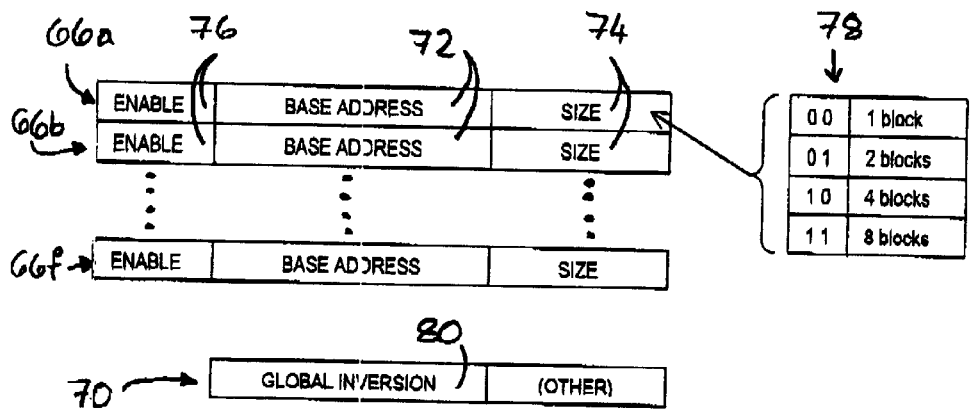
FIG. 5 is a schematic representation of the format of configuration registers in the first embodiment.

Referring to FIG. 5, in the present example, there are six address range configuration registers 66a–f (only three of which are illustrated), and a global control register 70. Each configuration register includes a base address or start address field 72, a size field 74 and an enable flag 76. The start address field 72 and the size field 74 are defined as, or at least to be, integer multiples of a predetermined granularity block size. In this embodiment, the address range is 0–65535 (corresponding to a 16-bit address bus), and the granularity block size is 4 KB. Also, since a size of zero blocks is meaningless (it makes no sense to define an allowable address range having zero size), the allowable values for the size field 74 are limited to 1, 2, 4 and 8 blocks, so that the size can be encoded in two bits, as shown at 78. It will be appreciated that the sizes referred to above are merely for the purposes of example (and in particular for comparison with the prior art example of FIG. 3), and may be very different in other embodiments. The global control register 70 includes a field 80 (referred to herein as a global inversion flag) for controlling globally whether the address ranges defined by the configuration registers 66a–f are interpreted by the control logic 64 to represent the cacheable address ranges, or whether they represent the non-cacheable address range. This contrasts to the prior art in which the configuration registers define only allowable (i.e., cacheable) address ranges.

Figure 6:
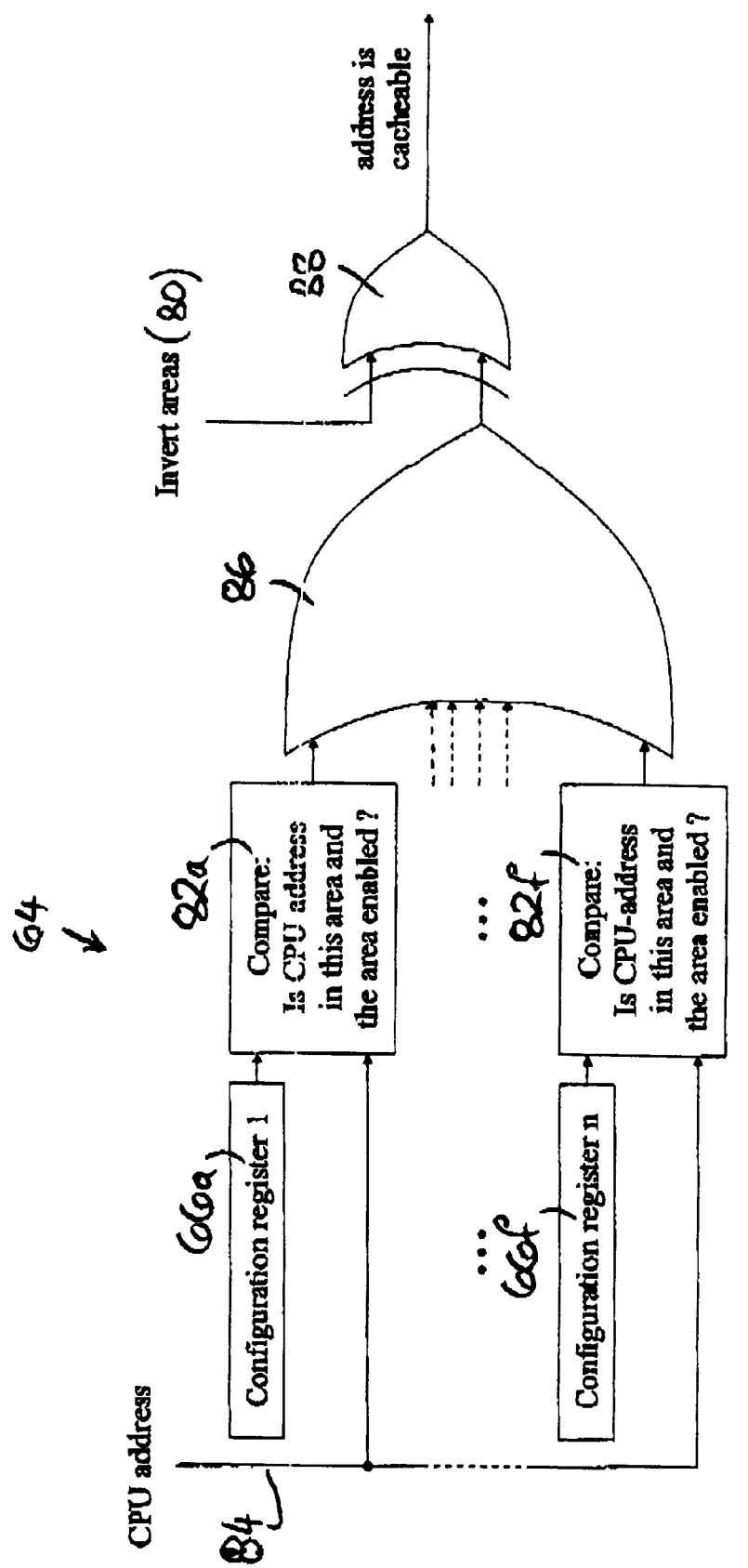
FIG. 6 is a partial schematic diagram of control logic responsive to the configuration registers in the first embodiment.

FIG. 6 illustrates schematically a part of the control logic 64 for processing the address ranges defined by the configuration registers 66. The circuit includes a separate comparator 82a–f for each configuration register 66a–f, for testing whether an incoming address (on line 84) falls within the address range defined by the respective configuration register 66a–f. (In order to avoid cluttering the drawing, only two comparators are shown explicitly). The comparator generates a logical high if the address falls within the range defined by that configuration register, or a logical low if the address is not in the range defined by that configuration register.

The outputs from the comparators 82a–f are coupled as inputs to a 6-input OR-gate 86. If any of the outputs from the comparators 82a–f is logical high (indicating that the incoming address falls within one of the specific ranges defined by the configuration registers 66a–f), then the output from the OR-gate 86 is also logical high. However, if all of the outputs from the comparators 82a–f are logical low (indicating that the address is not within any of the specific ranges defined by the configuration registers 66a–f), then the output from the OR-gate 86 is also logical low.

The global inversion flag field 80 of the control register 70 is then used to process the output from the OR-gate 86. The flag data 80 and the output from the OR-gate 86 are fed as inputs to an exclusive-OR (XOR) gate 88. If the inversion flag 80 is set (logical high) the exclusive-OR gate 88 acts as an inverter to invert the output from the OR-gate 86. If the inversion flag 80 is unset (logical low), then the output from the OR-gate passes through the XOR-gate 88 unchanged.

The output from the XOR-gate 88 is a signal which defines whether or not the incoming CPU-address falls within a cacheable range, or whether it is non-cacheable. A logical high indicates that the address is within a cacheable range, and a logical low indicates that the address is outside the cacheable range(s).

It will be appreciated that the inversion flag field 80 controls whether the address ranges defined by the configuration registers 66a–f are interpreted as representing cacheable address ranges or excluded non-cacheable ranges. This can provide a much more versatile technique for defining which address areas are cacheable. For example, FIG. 7 shows an address map defining cacheable ranges (in a similar manner to FIG. 3 described previously).

Figure 7:
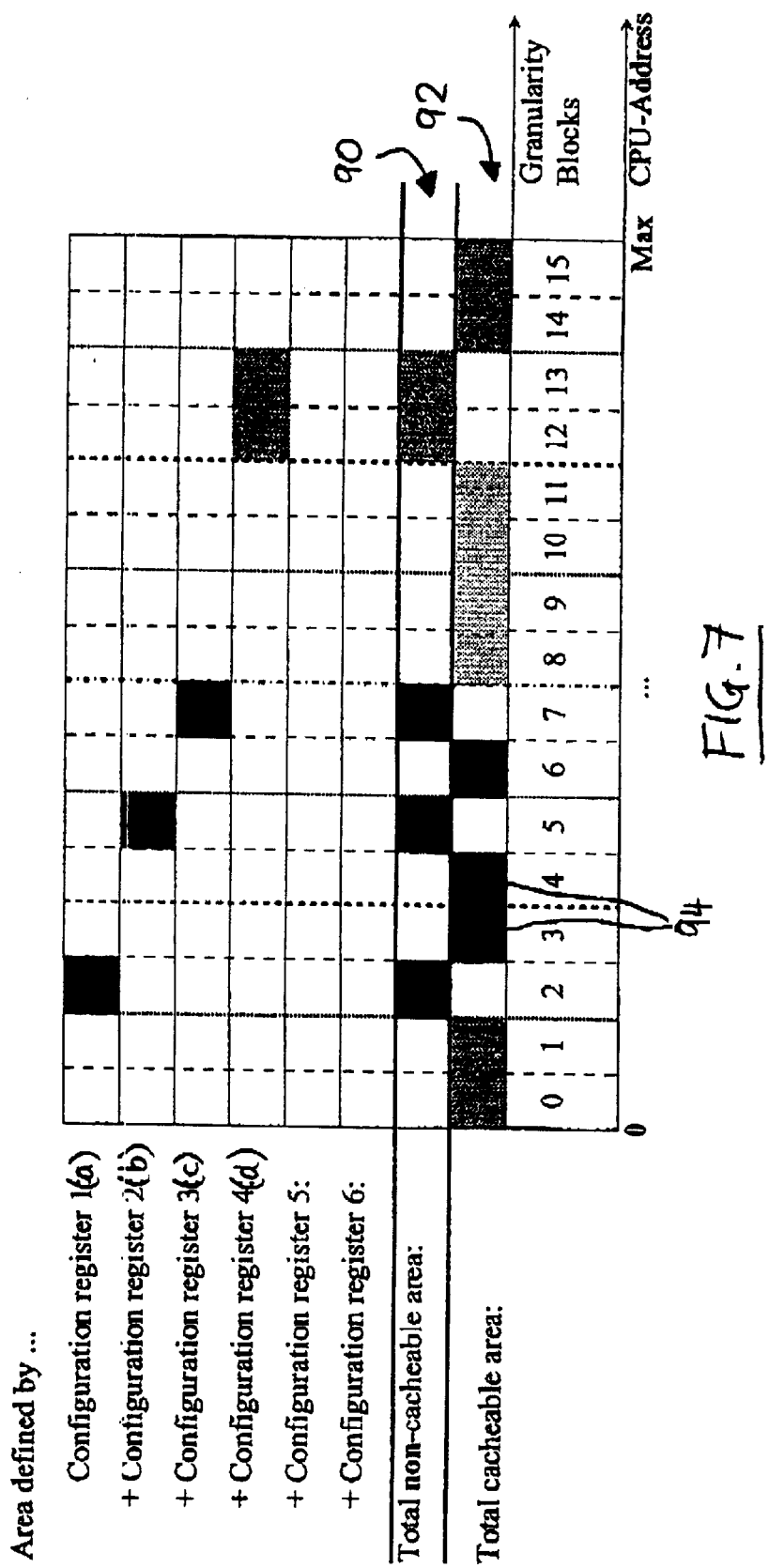
FIG. 7 is a schematic memory map showing a cacheable area memory map defined by the configuration registers.

In FIG. 7, four configuration registers (1–4 corresponding to 66a–d) are used to define four specific address ranges (dark or patterned regions). Row 90 represents the logical sum of these four address ranges. If the inversion flag 80 is unset, then these four regions would represent the allowed cacheable address ranges. If the inversion flag 80 is set, then the four ranges represent instead the non-cacheable address ranges, leaving the other possible addresses as the allowable ranges (as shown in row 92).

As can be seen in row 92, this results in six allowable address ranges (bearing in mind that the ranges 94 have to be treated as independent ranges, since the overall size of the ranges 94 is not aligned with the start address). Therefore, this embodiment can enable a greater number of address ranges to be defined than the number of configuration registers used to define the specific ranges. This would be impossible in the prior art.

Figure 8:
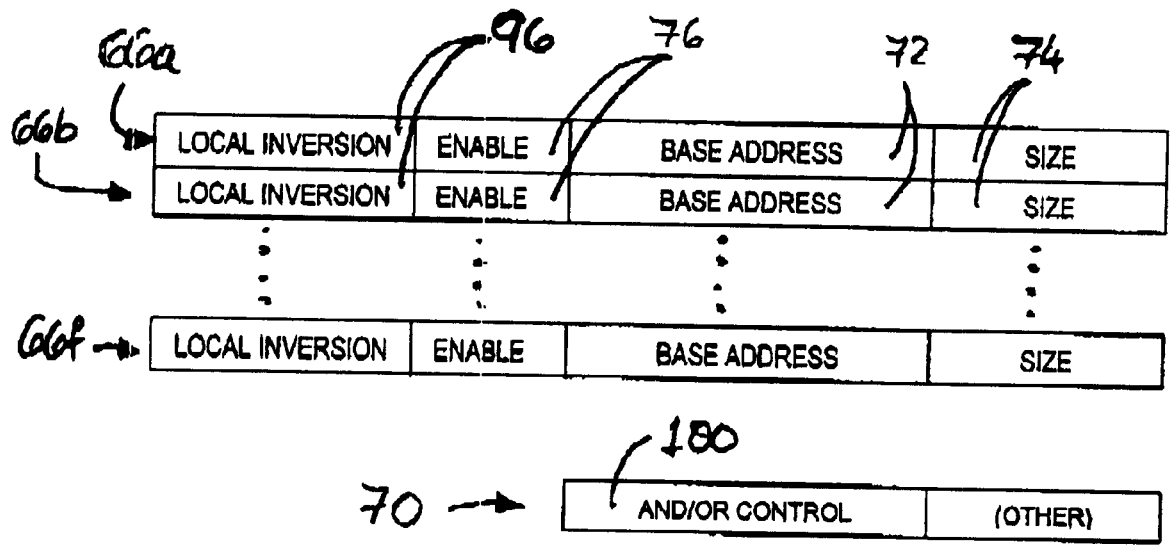
FIG. 8 is a schematic representation of the format of configuration registers in a second embodiment of the invention.

FIG. 8 illustrates the configuration register format for a modified second embodiment of the invention. In FIG. 8, instead of a global inversion flag, each configuration register includes an additional flag field 96 for controlling, for the respective configuration register, whether the address range being defined in the register is to be inverted or not. Instead of a global inversion flag, the control register 70 includes an AND/OR flag field 100 for controlling whether the address ranges should be processed using AND or OR logic.

Figure 9:
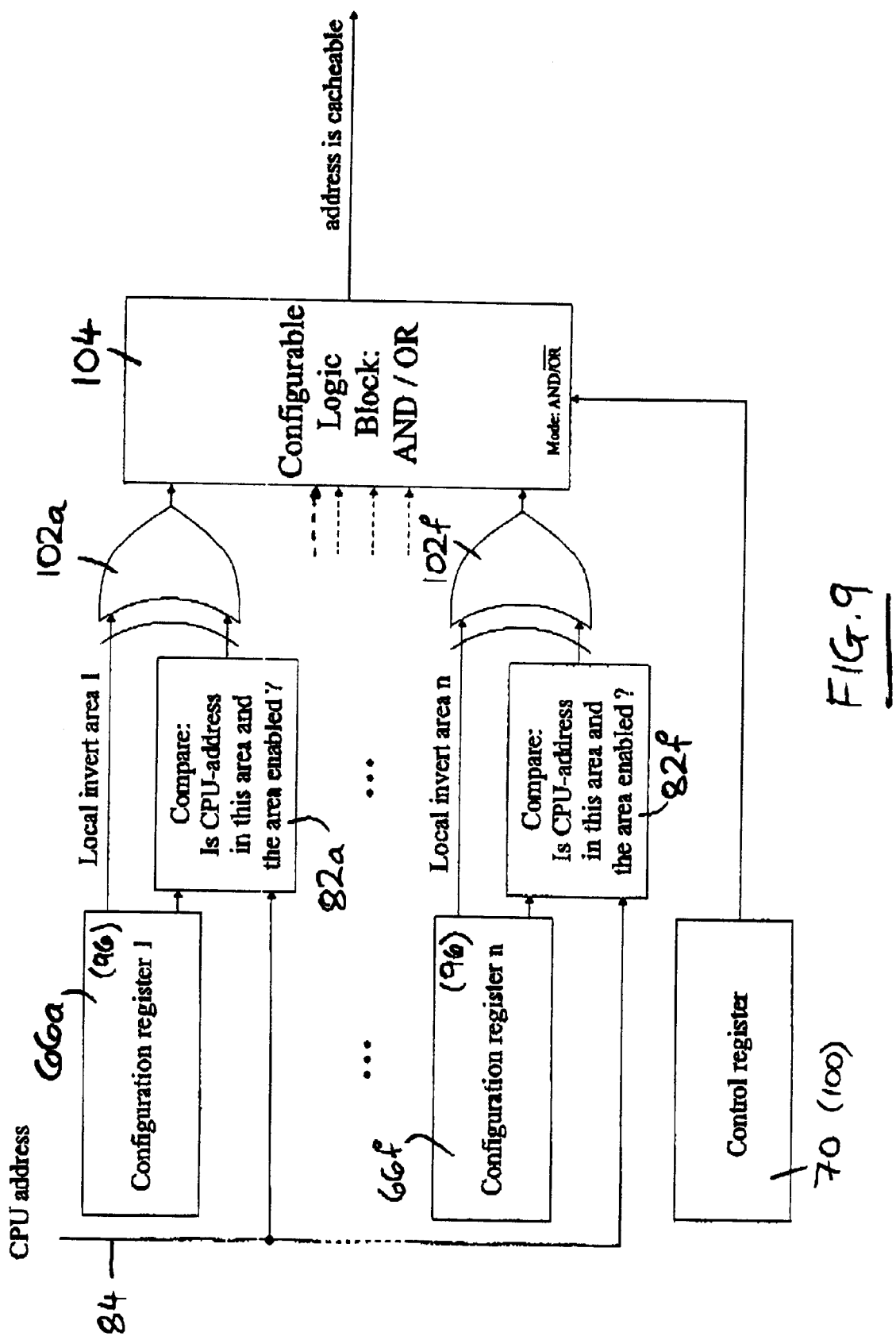
FIG. 9 is a partial schematic diagram of control logic responsive to the configuration registers in the second embodiment.

FIG. 9 illustrates a modified part of the control logic 64 for processing the register information of FIG. 8. As in the first embodiment, the circuit includes a separate comparator 82a–f for each configuration register 66a–f, for testing whether the incoming address on line 84 falls within the address range defined by the respective configuration register. The comparator generates a logical high if the address falls within the range defined by that configuration, or a logical low if the address is not in the range defined by that configuration register.

The circuit also includes a separate XOR-gate 102a–f for processing the output of each respective comparator 82a–f, according to the value of the local inversion flag 96 defined in each configuration register 66a–f. If the local inversion flag 96 is set (logical high) then the output from the comparator 82a–f is inverted at the XOR-gate 102a–f; if the local inversion flag 96 is unset (logical low), then the output from the comparator 82a–f is passed unchanged.

In the second embodiment, the 6-input OR-gate 86 of the first embodiment is replaced by a configurable AND/OR logic gate 104 having six inputs. The configurable gate 104 is controlled in response to the AND/OR flag 100 defined in the control register 70. If the flag 100 is set (logical high), then the configurable gate 104 is configured as an AND gate, and generates a logical high output only if the outputs from the XOR-gates 102a–f are all logical high. If the flag 100 is unset (logical low), then the configurable gate 104 is configured as an OR gate, and generates a logical high output if any of the outputs from the XOR-gates 102a–f is a logical high.

The purpose of the configurable gate 104 is to enable the programmer to decide whether the address ranges defined by the configuration registers should be combined using AND or OR logic. This is advantageous to accommodate all of the range definitions which can result from selectively inverting the comparison result of one or more configuration registers upstream of the AND/OR gate.

Figure 10:
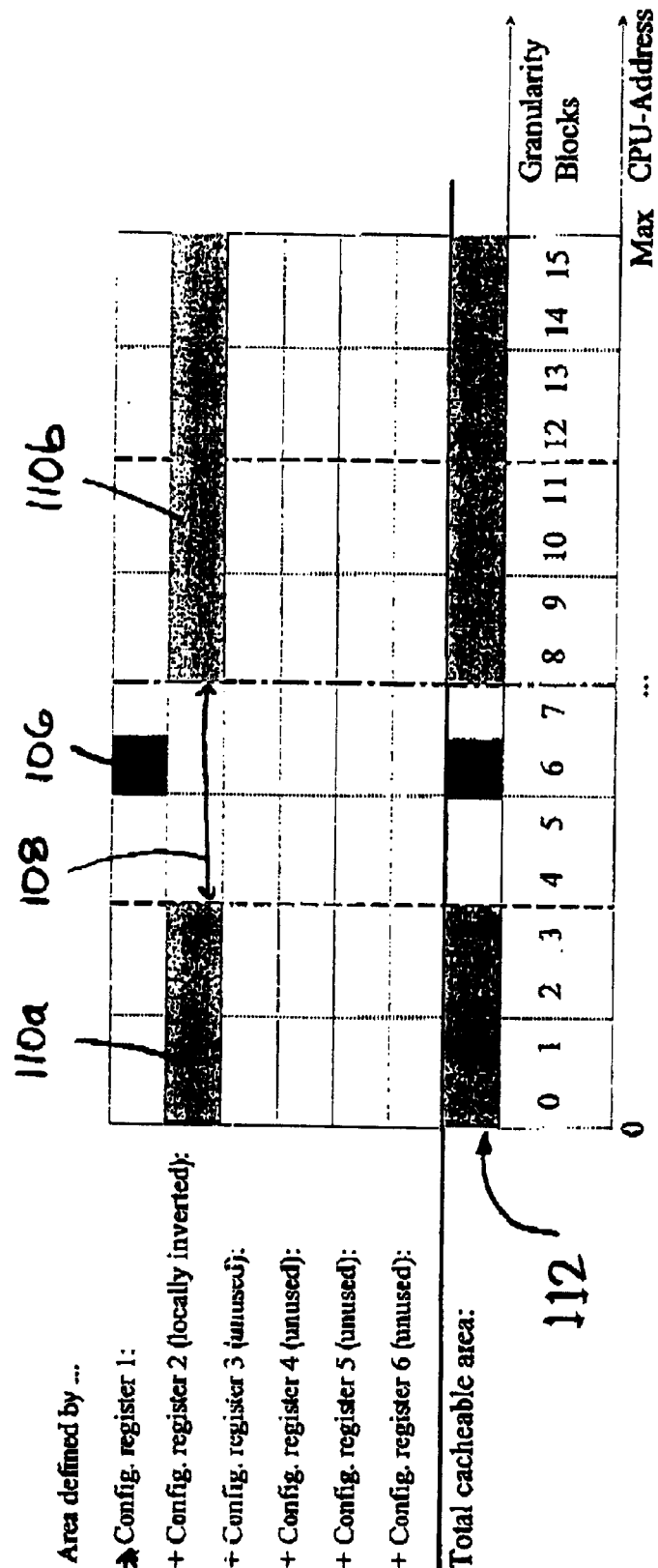
FIG. 10 is a schematic memory map showing a first example of a cacheable area memory map defined by the configuration registers in the second embodiment.

FIG. 10 illustrates a first example of memory map for the second embodiment, using only two configurations registers 66a and 66b. Register 66a defines a single block range 106, and the inversion flag for this register is unset, so that the address range is not inverted. Register 66b defines a four-block range 108. However, the inversion flag for this register is set, so that the four-block range 108 is inverted, to define effective ranges 101a and 110b.

As the ranges 106, 110a and 110b do not overlap, OR logic should be used to combine the ranges, and so the AND/OR flag in the control register is unset to configure the configurable gate 104 as an OR gate. The combined range is shown in row 112, which consists of three range segments. It will be appreciated that this example enables the three range segments to be defined using only two configuration registers. In contrast, in the prior art, at least three configuration registers would be required, one for each segment of the range.

Figure 11:
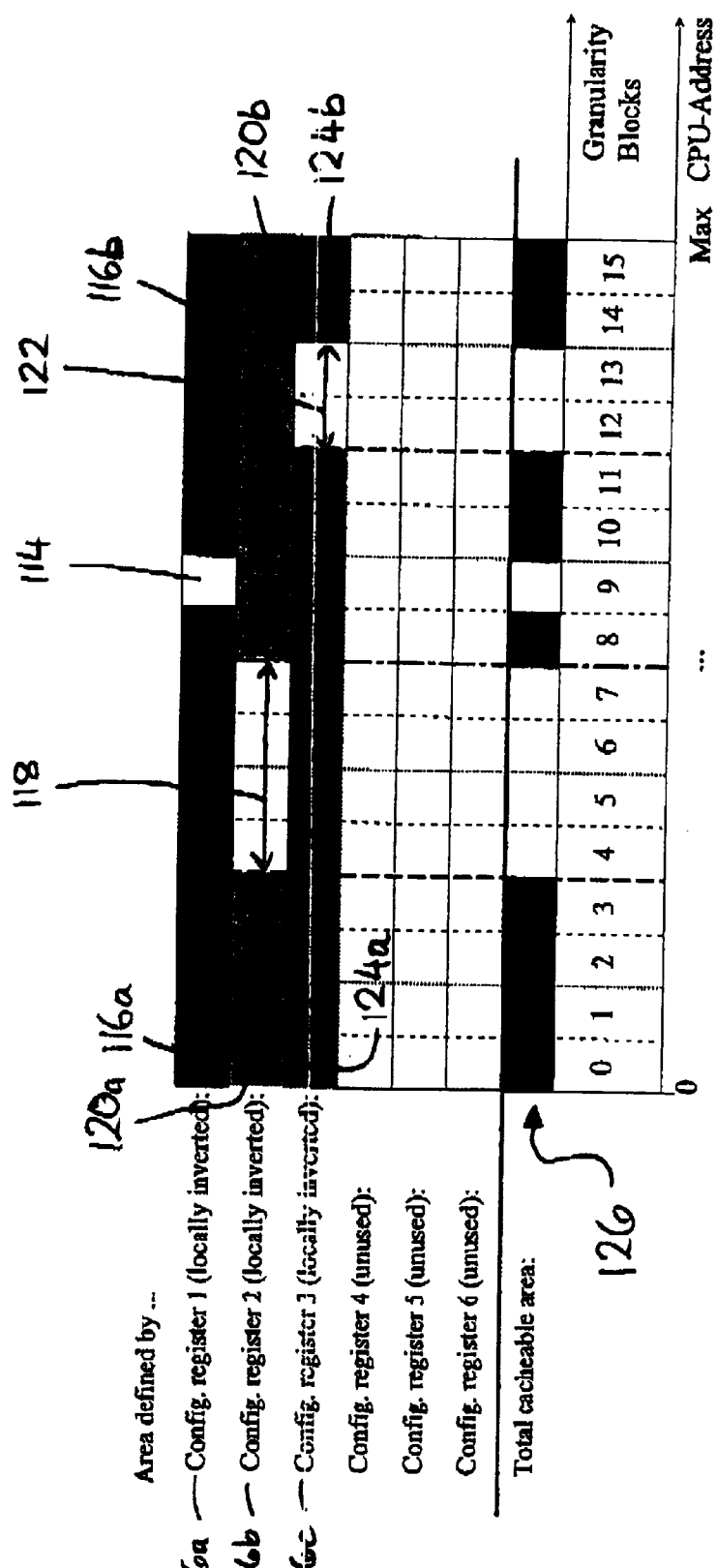
FIG. 11 is a schematic memory map showing a second example of a cacheable area memory map defined by the configuration registers in the second embodiment.

FIG. 11 illustrates a second example of memory map for the second embodiment, using only three configuration registers 66a–c. In this example, the inversion flag of all three registers 66a–c are set, so that the effective address range defined by each register is inverted. In particular, register 66a defines a single block area 114 which is inverted to define two ranges 116a and 116b. Register 66b defines a four-block area 118 which is inverted to define two ranges 120a and 120b. Register 66c defines a two-block area 122 which is inverted to define two ranges 124a and 124b.

Since the three effective ranges 116a/b, 120a/b 124a/b overlap, then AND logic should be used to combine the ranges. (If OR logic were to be used, then the combination of the ranges would simply define all possible addresses, which would be meaningless). Therefore, the AND/OR flag in the control register is set to configure the configurable gate 104 as an AND gate. The combined range is shown in FIG. 11 at row 126, and consists of four range segments. It will be appreciated that this example enables the four range segments to be defined using only three configuration registers. In contrast, in the prior art, at least four configuration registers would be required, one for each segment of the address range.

Figure 12:
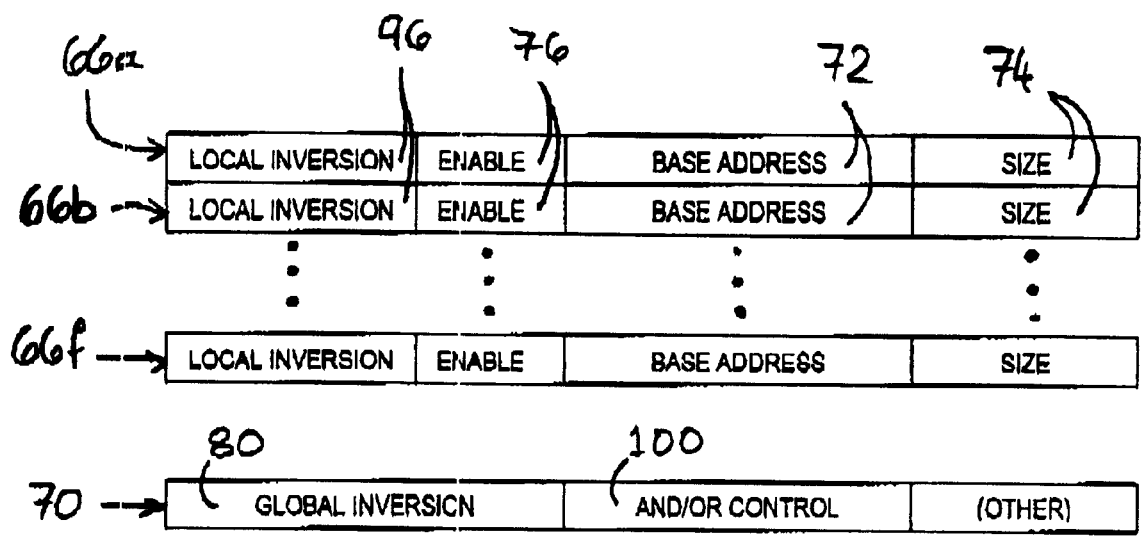
FIG. 12 is a schematic representation of the format of configuration registers in a third embodiment of the invention.
Figure 13:
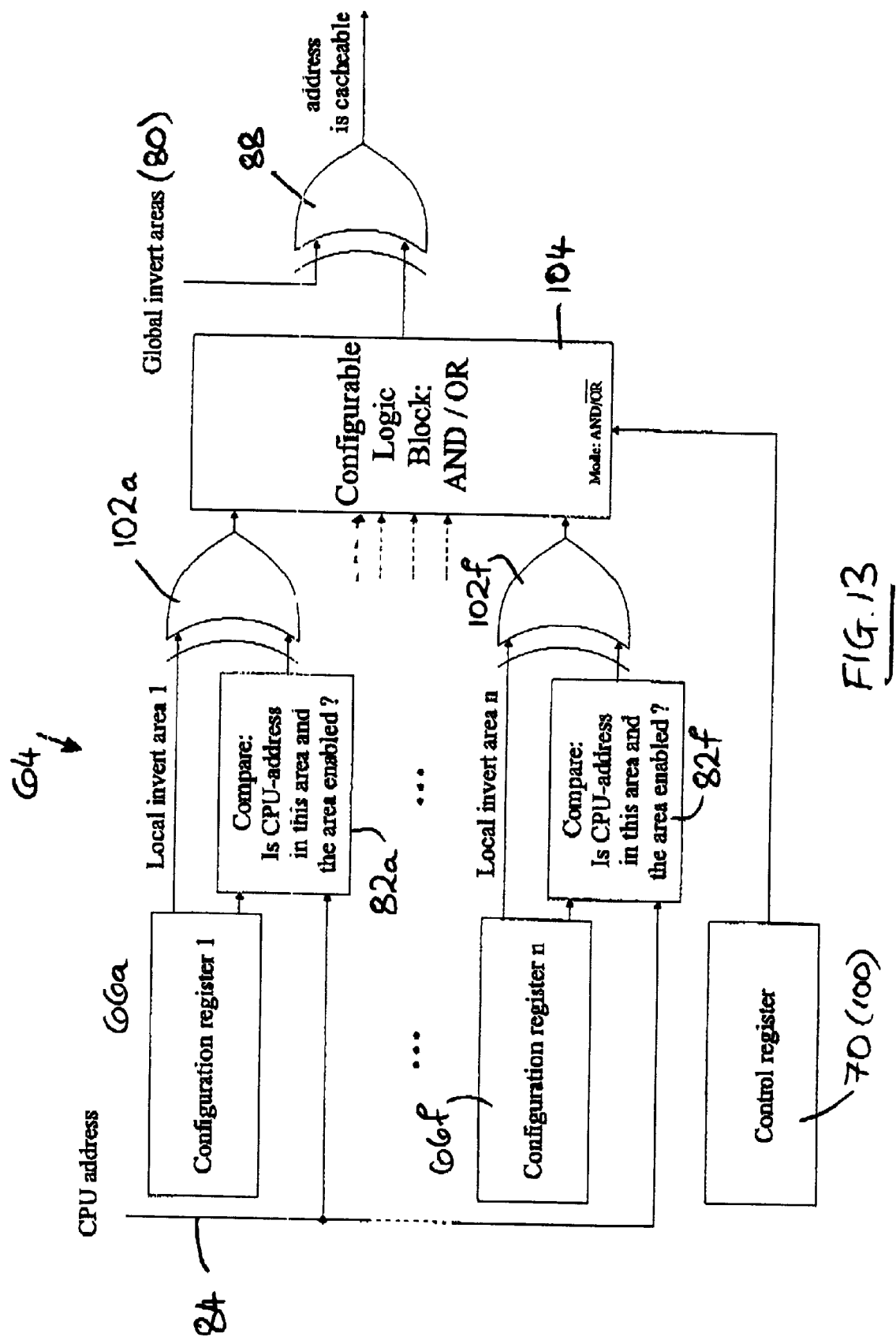
FIG. 13 is a partial schematic diagram of control logic responsive to the configuration registers in the second embodiment.
Figure 14:
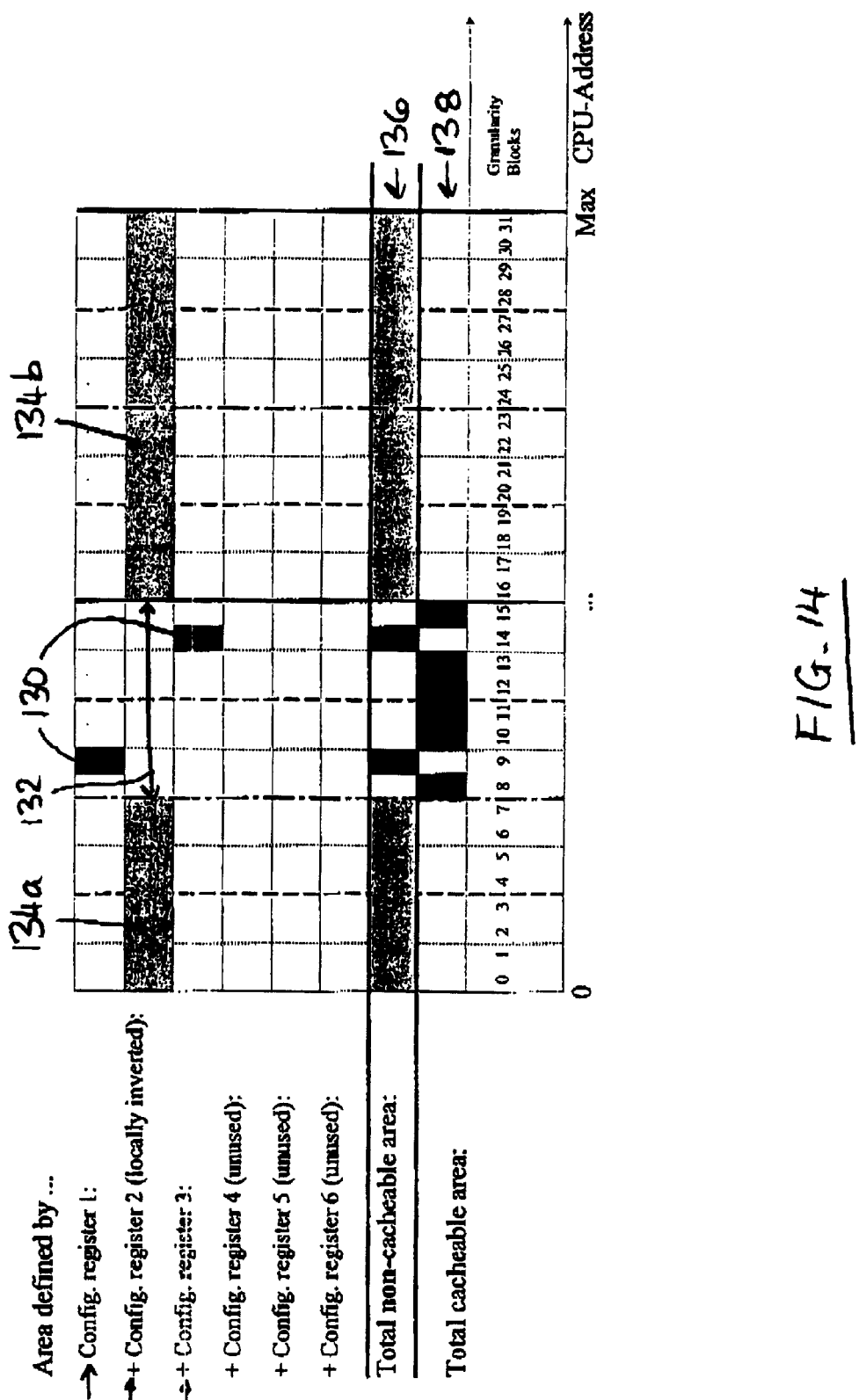
FIG. 14 is a schematic memory map showing a cacheable area memory map defined by the configuration registers in the third embodiment.

FIGS. 12–14 illustrate a third embodiment which is essentially a combination of the first and second embodiments. Referring to FIG. 12, the configuration registers 66 each include an inversion flag field 96 as described above for controlling whether the address range defined by the configuration register is to be inverted. The control register 70 includes an AND/OR flag field 100 as described above for controlling the configuration of the logic for combining the address ranges. The control register 70 also includes a global inversion flag field 80 as described above for controlling whether the effective net address range is also to be inverted, in addition to any local inversion of the range defined by each individual configuration register 66.

FIG. 13 illustrates schematically a part of the control logic 64 for processing the address ranges defined in FIG. 12. The circuit is very similar to that of FIG. 9, but additionally includes the XOR gate 88 of the first embodiment (FIG. 6) for selectively inverting the output from the configurable logic 104 in dependence on the value of the global inversion flag 80.

FIG. 14 illustrates an example of an address map defined in the third embodiment., using three configuration registers 66a–c. In this map, the number of granularity blocks is increased to 32 (and each square represents 2 blocks). The first and third registers 66a and 66c define single address blocks 130, and the local inversion flags for these registers are unset. The second register 66b defines an eight-block area 132, and the local inversion flag for this register is set, so that the area 132 is inverted into effective ranges 134a and 134b. Since the effective ranges 130 and 134 do not overlap, OR logic should be used to combine the ranges, and so the AND/OR flag in the control register is unset. If the global inversion flag is unset, then the effective combined address range is that shown in row 136. If the global inversion flag is set, the combined address range is inverted, to be that shown in row 138.

By way of comparison, FIG. 15 illustrates how the same address range as row 138 would have to be defined conventionally. In particular, since the four-block segment 140 of the combined range is not aligned with a four-block start address (i.e. the start address is not a multiple of 4 blocks), then the conventional segment would have to be defined using two separate control registers (registers 2 and 3 in FIG. 15). Accordingly, it will be appreciated that, in the same manner as the first and second embodiments, the third embodiment also provides advantages in enabling an address range to be defined using fewer configuration registers than coventionally. Since the third embodiment permits either or both of the inversions of the other embodiments, this would be the most versatile embodiment to implement.

Figure 16:
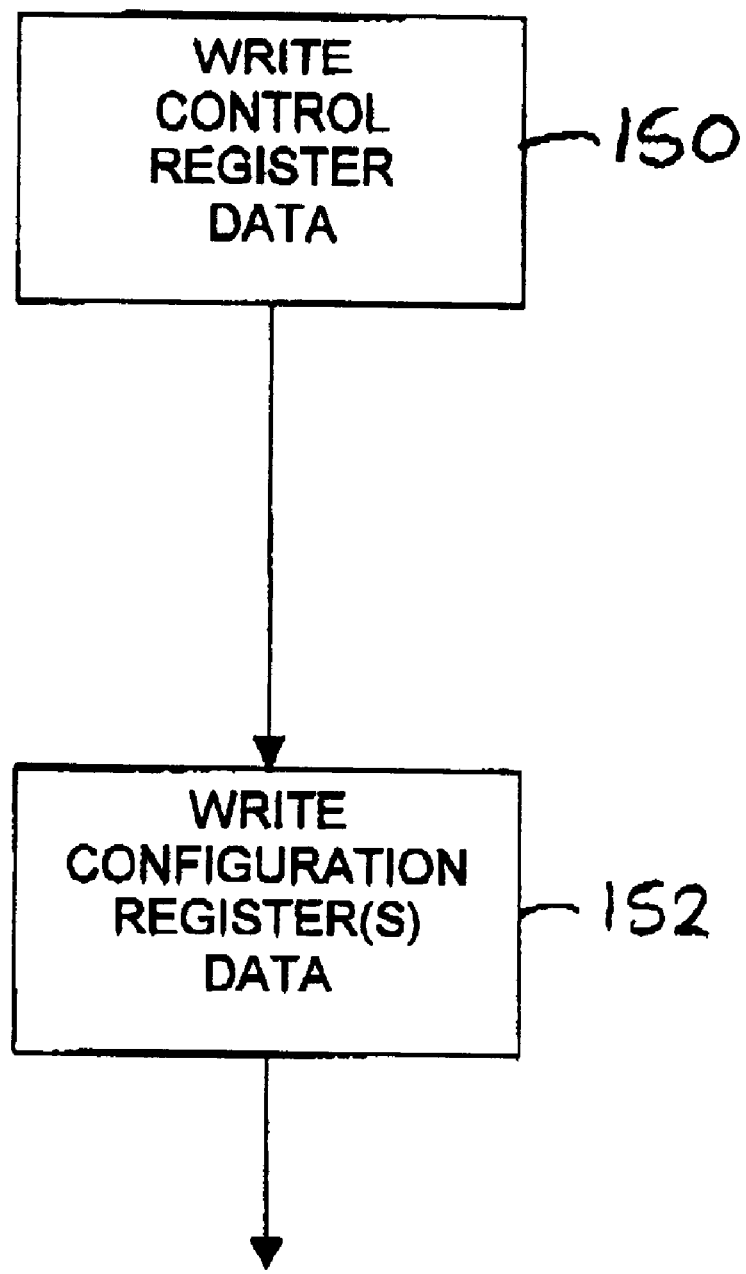
FIG. 16 is a schematic flow diagram illustrating the steps for programming the configuration registers of the embodiments.

Referring to FIG. 16, the configuration registers 66a–f and the control register 70 can be programmed by suitable external signals. In a first step 150, the values for the control register 70 are written, and in step 152, the values for the configuration registers 66a–f are written. (The illustrated order of programming may be reversed if desired). It will be appreciated that the registers contain additional information fields (flags 80, 96 and 100 depending on the embodiment). However, these fields can easily be accommodated within the currently unused fields typical in cache configuration and control registers. It will also be appreciated that, if desired, the additional field or fields required in the control register 70 could instead be transferred into one or all of the configuration registers 66, for example, if the fields could not be accommodated in the existing cache control register. Additionally or alternatively, a further control register could be provided to accommodate all of the local and/or global flags.

The invention, particularly as described in the preferred embodiments, therefore provides advantages in providing a considerably more flexible and versatile addressing scheme for defining the cacheable (or non-cacheable) address ranges in a cache, while still using the same logic architecture desired for high speed addressing. Moreover, the scheme can be compatible with current cacheable address range definitions. Although the preferred embodiments illustrate the invention applied to a cache, it will be appreciated that the same principles may be applied to any addressable circuit requiring an addressable range to be defined. For example, the invention may be applied to memory management units (MMU's), paging units, chip-select decoders, write buffers, etc. The foregoing, description is merely illustrative of preferred examples of the invention, and is not intended to limit the invention in any way. The skilled man will also readily understand that many modifications, equivalents and improvements may be used within the scope and principles of the invention, and the appended claims are intended to be interpreted broadly to include all such modifications, equivalents and improvements.

What is claimed is:

1. An addressable circuit comprising:
at least one register for defining a range used for determining an addressable range for said circuit;
at least one flag for defining whether a predetermined range is to be inverted for determining said addressable range for said circuit;
an input for receiving an address for an access to said circuit; and
control logic for processing said received address to determine whether said received address is within said addressable range for said circuit, said control logic being responsive to said register and to said flag for determining said addressable range therefrom.

2. The circuit according to claim 1, wherein said register comprises a plurality of registers, and said control logic determines whether said received address is within a combined address range defined by said plural registers.

3. The circuit according to claim 2, wherein said flag comprises a global inversion flag for indicating that said addressable area is an inversion of said combined address range defined by said plural registers.

4. The circuit according to claim 3, wherein said control logic is responsive to said global inversion flag to determine that a received address is within said addressable range if said received address is outside said combined address range defined by the plural registers.

5. The circuit according to claim 4, wherein said control logic generates a signal indicative of whether said received address is determined to be within said combined address defined range defined by said plural registers, and wherein said control logic comprises an inverter responsive to said global inversion flag for selectively inverting said signal.

6. The circuit according to claim 5, wherein said inverter comprises an exclusive-OR gate.

7. The circuit according to claim 2, wherein said flag comprises at least one local inversion flag associated respectively with at least one of said plurality of registers, for indicating for said respective register whether a range represented by said register is an inversion of an actual range contained in said register.

8. The circuit according to claim 7, wherein each said local inversion flag is contained within said register with which it is associated.

9. The circuit according to claim 7, wherein said control logic is responsive to each local inversion flag to determine whether said received address is within an actual range contained in said respective register, or to determine whether said received address is outside said actual range contained in the respective register.

10. The circuit according to claim 9, wherein said control logic comprises a plurality of comparator circuits for said plurality of registers for determining for each register whether said received address is within said actual range contained in the respective register, and a plurality of inverters for selectively inverting a plurality of outputs from said comparator circuits in response to said local inversion flags.

11. The circuit according to claim 10, further comprising a combination logic for combining said outputs from said comparator circuits for generating a signal indicative of whether said received address is within said combined address range represented by said registers, wherein said combination logic comprises gate logic selectively configurable as an AND gate or as an OR gate.

12. The circuit according to claim 11, wherein said flag further comprises an AND/Or flag for controlling operation of said combination logic.

13. The circuit according to claim 1, wherein said circuit is a cache circuit.

14. A method of operation in an addressable circuit, comprising the steps of:

(A) providing first data representing at least one range segment used for determining an addressable range for said circuit;

(B) providing at least one flag for indicating whether a predetermined address range is to be inverted for determining said addressable range for said circuit;

(C) receiving an address for an access to said circuit; and (D) processing said received address to determine whether said received address is within said addressable range for said circuit, said processing being responsive to said first data and to said flag for determining said addressable range therefrom.

15. The method according to claim 14, wherein said flag includes a global inversion flag for indicating whether said addressable range corresponds to a combined address range derived from said first data, or whether said addressable range is an inversion of said combined address derived from said first data.

16. The method according to claim 14, wherein said flag includes at least one local inversion flag associated with said address range segment, and wherein the step of processing comprises the sub-step of selectively inverting said address segment in response to said local inversion flag.

17. A method of programming an addressable circuit to define an addressable range therefor, the method comprising the steps of:

(A) writing information representing at least one address range segment used for determining said addressable range; and (B) writing at least one flag for indicating whether a predetermined address range is to be inverted for determining said addressable range.

18. The method according to claim 17, wherein said flag includes a global inversion flag for indicating whether said addressable range corresponds to a combined address range derived from said information, or whether said addressable range is an inversion of said combined address derived from said information.

19. The method according to claim 17, wherein said flag includes at least one local inversion flag associated with said address range segment, for indicating whether a combined address range derived from said information includes said segment, or whether said combined address range includes an inversion of said segment.

20. An addressable circuit comprising:

means for providing first data representing at least one range segment used for determining an addressable range for said circuit;

means for providing at least one flag for indicating whether a predetermined address range is to be inverted for determining said addressable range for said circuit;

means for receiving an address for an access to said circuit; and means for processing said received address to determine whether said received address is within said addressable range for said circuit, said processing being responsive to said first data and to said flag for determining said addressable range therefrom.

* * * * *